(12) United States Patent
Lev et al.

(10) Patent No.: US 9,040,186 B2
(45) Date of Patent: May 26, 2015

(54) METHOD AND DEVICE TO MEASURE TEMPERATURE OF A PRISMATIC CELL OF AUTOMOTIVE BATTERY

(75) Inventors: Leonid C. Lev, West Bloomfield, MI (US); Nikolay Kondratyev, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 316 days.

(21) Appl. No.: 13/396,677

(22) Filed: Feb. 15, 2012

(65) Prior Publication Data

US 2013/0209846 A1 Aug. 15, 2013

(51) Int. Cl.
*H01M 10/48* (2006.01)

(52) U.S. Cl.
CPC ............ *H01M 10/48* (2013.01); *H01M 10/482* (2013.01); *H01M 10/486* (2013.01)

(58) Field of Classification Search
USPC .......................................................... 429/90
See application file for complete search history.

(56) References Cited

U.S. PATENT DOCUMENTS

| 5,134,248 | A  | * | 7/1992 | Kiec et al. .................... 174/84 R |
|---|---|---|---|---|
| 6,152,597 | A  | * | 11/2000 | Potega .......................... 374/185 |
| 7,495,542 | B2 |   | 2/2009 | Saio et al. |
| 8,054,039 | B2 |   | 11/2011 | Bauerle et al. |
| 2010/0321025 | A1 |   | 12/2010 | Lin et al. |
| 2011/0039137 | A1 | * | 2/2011 | Engle et al. ..................... 429/90 |
| 2011/0117463 | A1 |   | 5/2011 | Lienkamp et al. |
| 2011/0148363 | A1 |   | 6/2011 | Frisch et al. |
| 2011/0293983 | A1 |   | 12/2011 | Oury et al. |
| 2011/0299564 | A1 |   | 12/2011 | Leutheuser et al. |
| 2012/0025835 | A1 |   | 2/2012 | Chandler et al. |
| 2012/0088135 | A1 | * | 4/2012 | Kim et al. ........................ 429/90 |
| 2013/0004811 | A1 | * | 1/2013 | Banerjee et al. ................ 429/62 |

* cited by examiner

*Primary Examiner* — Jonathan Jelsma
(74) *Attorney, Agent, or Firm* — Fraser Clemens Martin & Miller LLC; William A. Ziehler

(57) ABSTRACT

Apparatuses and methods of use are provided that include a battery cell comprising a flexible resistive thermal device. The resistive thermal device includes a flexible conductive circuit that is positioned on or adjacent to the surface of the battery cell. Resistance measured in the conductive circuit is correlated with a temperature of the battery cell thereby allowing control of a cooling system and/or the charging/discharging rates of the battery cell to be adjusted in response to temperature. Flexibility of the resistive thermal device also accommodates dimensional changes in the battery cell.

21 Claims, 4 Drawing Sheets

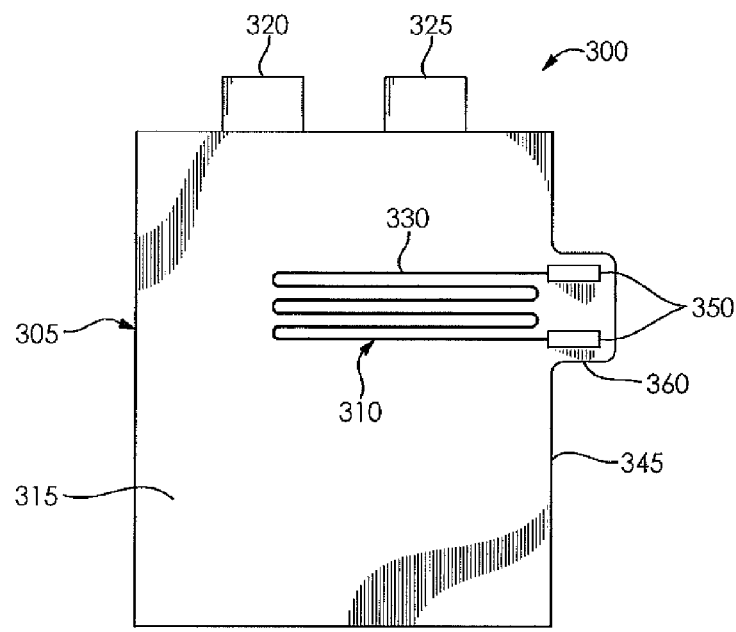
FIG. 3
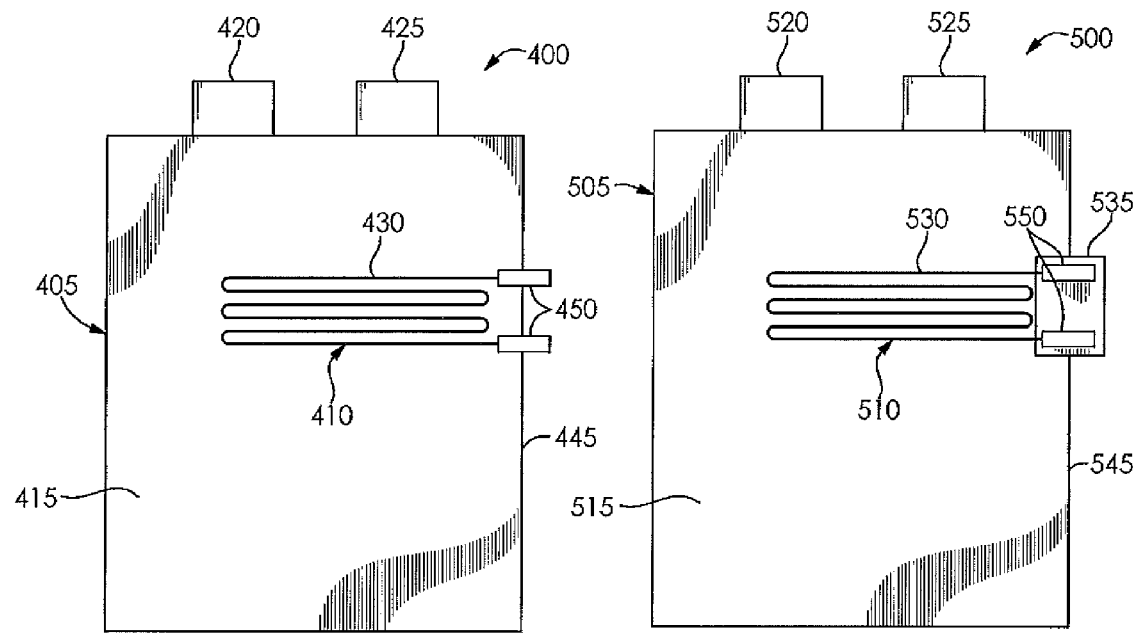
FIG. 4
FIG. 5

METHOD AND DEVICE TO MEASURE TEMPERATURE OF A PRISMATIC CELL OF AUTOMOTIVE BATTERY

FIELD OF THE INVENTION

The present technology relates to temperature measurement of a battery cell, including a battery cell comprising a flexible resistive thermal device.

BACKGROUND OF THE INVENTION

This section provides background information related to the present disclosure which is not necessarily prior art.

Electrical systems within vehicles, such as hybrid, electric, and fuel cell vehicles, have advanced in complexity and power usage. Such vehicles can use an electric motor in combination with a battery power source. The battery can power the vehicle alone or can work in conjunction with another power source, such as an internal combustion engine.

High power output and large capacity batteries can be used as the battery power source. A number of battery cells can be connected in series or parallel with each other so as to construct a larger battery assembly. The battery cells can be packaged together with various mechanical and electrical couplings between the battery cells to form the assembly. One type of battery assembly includes prismatic batteries or pouch-shaped batteries placed in a stacked relationship to reduce space and overall size of the assembly. For example, lithium-ion battery cells can be formed as prismatic battery cells that utilize a pouch filled with a liquid or a polymer electrolyte. Such prismatic battery cells can exhibit changes in thickness during charging/discharging and over a lifetime of the cells. For example, each battery cell pouch can swell or contract, effecting a change in one or more dimensions of the battery cells and battery assembly.

Heat can be generated by the battery cells during a charging process and a discharging process. Heat that accumulates in the battery assembly can adversely affect the battery cells. Accordingly, a cooling system can be provided to maintain a desirable operating temperature. Such cooling systems can include some manner of heat sink or fluid heat exchanger where air is blown over the battery cells and/or a liquid coolant is used. For example, a cooling system can include one or more cooling plates or fins sandwiched between individual battery cells within the battery assembly. In some cases, the cooling system can have channels through which a fluid (e.g., coolant) flows in a heat transfer relationship with the battery cells.

The temperature of a battery cell in a battery assembly is an important factor related to the serviceable life and performance of the battery. As battery assemblies can have many battery cells stacked together, temperature can be different at different locations in the assembly. Moreover, individual battery cells can vary in performance and hence operating temperature due to variations in manufacture. Thus, there is a need for accurate determination of the temperature of a battery cell, including the multiple battery cells within a battery assembly.

SUMMARY OF THE INVENTION

The present technology includes systems, processes, and articles of manufacture that provide for temperature measurement of battery cells, such as battery cells stacked to form a battery assembly.

A battery cell comprising a flexible resistive thermal device (RTD) for determining a temperature of the battery cell is provided. The resistive thermal device contacts a surface of the battery cell and comprises a conductive circuit and a plurality of terminals electrically connected to the conductive circuit. The plurality of terminals of the flexible RTD can extend from or beyond the battery cell and can extend beyond a frame disposed about the battery cell. The flexible RTD can include a substantially nonconductive substrate positioned between the conductive circuit and the surface of the battery cell where a portion of the substantially nonconductive substrate extends from the battery cell and comprises the plurality of terminals. Alternatively, the conductive circuit can be printed directly on the battery cell surface. One or more battery cells comprising the flexible RTD can be used to form a battery assembly. A battery management system can be electrically connected to the plurality of terminals of the flexible RTD.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 3 is a schematic plan view of yet another embodiment of a battery cell comprising a flexible resistive thermal device.

FIG. 4 is a schematic plan view of yet another embodiment of a battery cell comprising a flexible resistive thermal device.

FIG. 5 is a schematic plan view of yet another embodiment of a battery cell comprising a flexible resistive thermal device.

DETAILED DESCRIPTION OF EXEMPLARY EMBODIMENTS OF THE INVENTION

Figure 1:
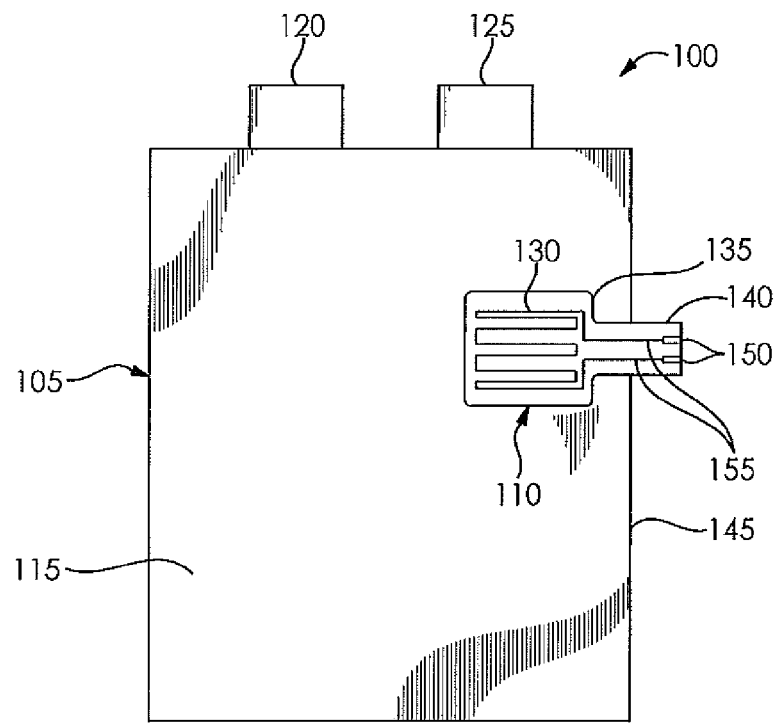
FIG. 1 is a schematic plan view of an embodiment of a battery cell comprising a flexible resistive thermal device.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding the methods disclosed, the order of the steps presented is exemplary in nature, and thus, the order of the steps can be different in various embodiments where possible.

The present technology relates to temperature measurement of one or more battery cells to optimize operation of the battery cell and related systems. For example, temperature measurement of a battery cell allows tailoring of charging and discharging rates and can affect operation of a battery cooling system to maintain a desired temperature. In this fashion, battery cell lifespan and performance can be maximized where the temperature of an individual battery cell is an important factor related to the serviceable life and performance of the battery cell.

One way to measure the temperature of a prismatic battery cell in a battery assembly is by using one or more thermistors. To enable effective cooling of the battery cell, a cooling fin can be disposed alongside the battery cell, where a sufficient pressure can be applied to cause the cooling fin to abut the cell to provide effective thermal transfer therebetween. A rigid thermistor placed between the battery cell and the cooling fin may impinge upon a prismatic battery cell pouch when pressure is applied. Accordingly, a protective layer (e.g., a layer of foam) can be used to separate the thermistor from the battery cell. However, the layer of foam can lower the accuracy of the temperature measurement.

Use of a thermistor to measure temperature of the battery cell can present other issues. For example, contact between the thermistor and a battery management system can be established by urging an interconnect board into contact with the rigid thermistor. The contact can take the form of a generally inflexible coupling as the rigid thermistor is not amenable to movement. As one or more of the battery cells swell and change in thickness during operation, the inflexible coupling between the thermistor and the interconnect board can result in unreliable contact, noise, and/or drift in temperature measurements. What is more, there may only be a few thermistors used in a battery assembly, situated near the assembly ends, for example. The battery assembly ends may be cooler than the rest of the battery assembly, resulting in an incomplete and distorted distribution of temperature measurements.

The present technology addresses temperature measurement of battery cells and issues related to other temperature measurement means such as thermistors. A flexible resistive thermal device (RTD) is utilized to increase the accuracy and reliability of the temperature measurement of one or more battery cells within a battery assembly to improve aspects such as battery cooling, battery management, lifespan, etc. The flexible RTD, also known as a resistance thermometer or resistance temperature detector, is a sensor that can determine temperature by correlation of the electrical resistance of a conductive circuit of the RTD with temperature. A current and voltage drop can be measured through the conductive circuit to determine a resistance. The conductive circuit can be made from a material wherein a resistance thereof at various temperatures is known or determined. The material provides a change in resistance as the temperature changes, where the resistance change can be used to determine the temperature to which the RTD is exposed.

The conductive circuit of the RTD can be formed in various ways, such as a thin-film, and can take various shapes and employ various materials. The RTD is flexible in that the RTD can readily flex and bend to accommodate a change in one or more dimensions of the battery cells and battery assembly. Suitable flexible RTDs that can be used and/or adapted for use in the present technology include those by Minco (Minneapolis, Minn.), such as the Thermal-Ribbons™ thin, flexible RTDs, and flexible RTDs by Omega Engineering, Inc. (Stamford, Conn.). Other flexible RTDs include those described in U.S. Pat. No. 7,495,542 to Saio et al., which is incorporated herein by reference.

In some embodiments, a battery cell comprising a flexible resistive thermal device (RTD) for determining a temperature of the battery cell is provided where the resistive thermal device contacts a surface of the battery cell and comprises a conductive circuit and a plurality of terminals electrically connected to the conductive circuit. The conductive circuit can be used for measuring resistance as correlated to temperature and the terminals can be used for outputting the electrical resistance in response to a temperature sensed by the conductive circuits. For example, wires or other electrical connections can be connected to the terminals.

The battery cell can comprise a prismatic battery cell, such as a lithium-ion battery cell. The battery cell can include a positive electrode (e.g., aluminum tab of a lithium-ion prismatic battery) and a negative electrode (e.g., copper tab of a lithium-ion prismatic battery), where each can be positioned on the same side or different sides of the battery cell. The flexible RTD, including the conductive circuit, can cover anywhere from a portion of the surface of the battery cell to the entire surface of the battery cell in order to provide an averaged temperature over the surface of the cell. However, the flexible RTD can also cover portions of the battery cell that relate to the hottest area of the battery cell to provide the maximum temperature of the battery cell. For example, the flexible RT can cover at least a quarter of the battery cell surface. The flexible RTD can also be positioned on the surface of the battery cell proximate to the positive electrode of the battery cell, as the highest temperature in some battery cells can occur near the positive electrode.

When the surface of the battery cell is substantially nonconductive, the conductive circuit of the flexible RTD can be disposed or formed directly on the surface of the battery cell. For example, the conductive circuit can be printed, transferred as a decal, sputtered, or plated directly onto the battery cell surface. The terminals can be formed similarly or the terminals can be formed on a substrate that is attached to the battery cell surface and that can extend from the surface of the battery cell. In certain embodiments, the battery cell can include a tab that extends from a remainder of the battery cell and the terminals can be formed on the tab. Extension of the terminals beyond the main body of the battery cells allows access to the terminals after the battery cell including the flexible RTD is placed within a frame, for example.

The flexible RTD can include one or more conductive circuits where each conductive circuit can comprise a loop of various shapes and patterns, including a generally a serpentine pattern to cover a certain surface area of the battery cell. The conductive circuit can be formed as a thin-film of conductive material using various methods, including etching, printing, transferring, sputtering, or plating methods. For example, the thin-film of conductive material can have a thickness of about 1 nm to about 10 nm, although other thickness can be used. The conductive circuit can comprise one or more metals and alloys thereof where the resistance of the conductive circuit is sensitive to temperature. Metals include gold, silver, copper, platinum, tungsten, nickel, aluminum and alloys thereof. In a particular embodiment, the conductive circuit comprises aluminum, which was used to form a flexible RTD that was very stable, reliable, and precise.

The RTD can include a substantially nonconductive substrate positioned between the conductive circuit and the surface of the battery cell. For example, the substantially nonconductive substrate can alleviate issues that may arise from conductivity of the battery cell surface, depending on the material(s) used to form the battery cell pouch. Alternatively, the substantially nonconductive substrate allows the flexible RTD to be manufactured as a separate unit that can be contacted to the surface of the battery cell. The conductive circuit, terminals, and any other components (e.g., leads) of the flexible RTD can be integrally formed either on the surface of the flexible substrate, or within a thickness thereof. For example, the conductive circuits and terminals can be disposed on one side of the substantially nonconductive substrate or disposed between two layers of the substrate. The substantially nonconductive substrate can comprise one or more polymers, including various elastomers, polyimide, silicone rubber, polyester, polytetrafluoroethylene, among others. The substantially nonconductive substrate of the flexible RTD can be attached to the battery cell surface using an adhesive, such as a pressure sensitive adhesive, and including various high thermal conductivity adhesives. The adhesive can be applied to just a portion of the substrate; e.g., adhesive can attach a portion of the substrate including the conductive circuit while no adhesive is used on a portion of the substrate including the terminals.

In some embodiments, the battery cell comprising the flexible RTD is configured such that the plurality of terminals of the flexible RTD extend from the battery cell. Extension of the terminals from the battery cells allows access to the terminals after the battery cell including the flexible RTD is placed within a frame and/or stacked alongside other battery cells. The extended terminals allow the flexible RTD to be coupled to an interconnect board of a battery management system, for example. In particular, as the RTD is flexible, the RTD can flex relative to the interconnect board when the battery cell changes one or more dimensions by swelling or contracting during charge/discharge. The flexing prevents the RTD from being disconnected from the interconnect board.

The battery cell comprising the flexible RTD can further include a plurality of leads, where each lead connects a terminal of the plurality of terminals to the conductive circuit. For example, where the plurality of terminals of the flexible RTD extend from the battery cell, the leads can run from the extension or tab to the conductive circuit. The leads can be made of the same material as the conductive circuit or can be made of a different conductive material.

Various configurations are possible for the battery cell comprising the flexible RTD where the plurality of terminals of the flexible RTD extend from the battery cell. In some embodiments, the battery cell comprising the flexible RTD includes a substantially nonconductive substrate positioned between the conductive circuit and the surface of the battery cell where a portion of the substantially nonconductive substrate extends from the battery cell and comprises the plurality of terminals. In other embodiments, the plurality of terminals can be disposed on a tab of the battery cell extending from a remainder of the battery cell. That is, the battery cell can comprise a portion of the outer surface that extends from a remainder of the battery cell, such as a tab; e.g., the tab can be integral to the pouch of the battery cell. In yet other embodiments, the plurality of terminals can be disposed on a portion of a substantially nonconductive substrate that extends from the battery cell.

The battery cell comprising the flexible RTD can be disposed a frame where the plurality of terminals extend outside of the frame. The frame can include a multi-piece frame where the terminals extend through and outside of the frame. Multiple battery cells comprising flexible RTDs disposed within frames can be assembled into a battery assembly where the terminals of each RTD extend on the same side of the assembly for connection to an interconnect board. Moreover, where the extended terminals are positioned on a tab-like structure of the battery cell surface or a portion of the substantially nonconductive substrate, the terminals can be accessed from either side of the tab; i.e., two-sided access to terminals that can be positioned on one or both sides of the tab.

In some embodiments, a battery assembly is provided that includes a plurality of battery cells, wherein at least one battery cell comprises a flexible RTD as described herein. For example, each battery cell in the assembly can include a flexible RID, alternating battery cells in the assembly can include flexible RTDs, or other spacings of battery cells can include flexible RTDs. The terminals of the RTDs can be connected to an interconnect board of a battery management system that can determine the temperature of particular battery cells based on resistance measurements of the RTDs. Examples of interconnect boards and battery management systems include U.S. Pat. No. 8,054,039 to Bauerle et al. and U.S. Pat. Appl. Pub. Nos. 201210025835 to Chandler et al.; 2011/0148363 to Frisch et al., 2011/0117463 to Lienkamp et al., and 2010/0321025 to Lin et al. After connecting the flexible RTD to the battery management system, the connections and/or terminals of the RTDs can be taped to the body of the battery assembly.

EXAMPLES

With reference to FIG. 1, a first embodiment 100 of a battery cell 105 comprising a flexible RTD 110 for measuring a resistance and determining a temperature of the battery cell 105 is shown. The battery cell 105 includes a substantially planar surface 115, a negative electrode 120, and a positive electrode 125. The flexible RTD 110 comprises a conductive circuit 130 on a flexible and substantially planar substrate 135 that is disposed on the surface 115 of the battery cell 105. The substrate 135 comprises an insulating material; that is, the substrate 135 is substantially nonconductive. A portion 140 of the substrate 135, depicted as a tab, extends beyond an edge 145 of the surface 115 of the battery cell 105. The portion 140 includes a plurality of terminals 150 electrically connected to the conductive circuit 130 via leads 155 and can be electrically connected to an interconnect board of a battery management system (not shown). The terminals 150 can be placed on one or both sides of the portion 140 of the substrate 135. The portion 140 of the substrate 135 can also extend through or beyond a frame disposed around the battery cell 105 to facilitate coupling of a measuring circuit from the interconnect board of the battery management system to the terminals 150. The flexible RTD 110 is attached to the battery cell 105 using a high thermal conductivity adhesive. The adhesive is disposed between the battery cell 105 and the substrate 135, but not on the portion 140 of the substrate 135 extending beyond the edge 145 of the surface 115 of the battery cell 105.

Figure 2:
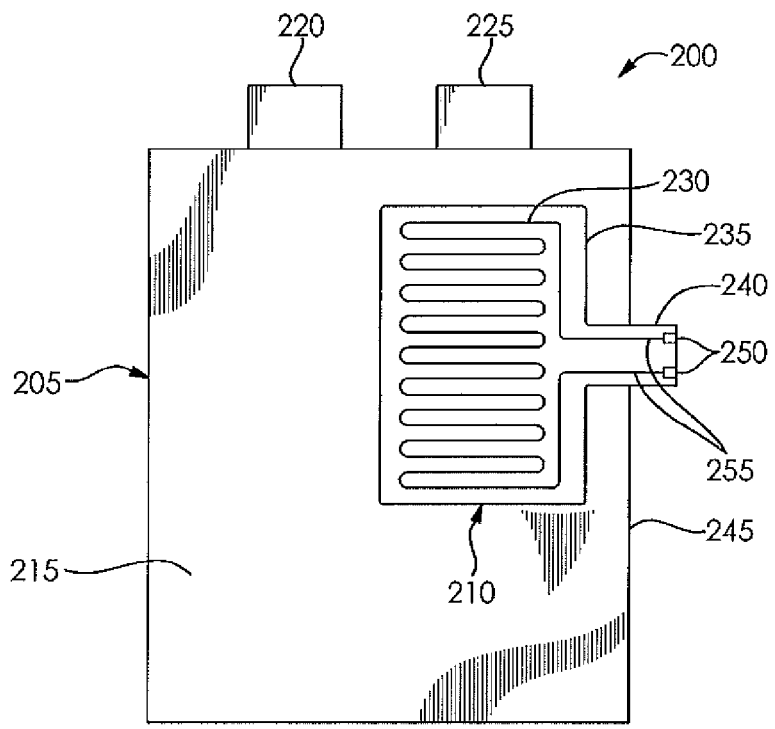
FIG. 2 is a schematic plan view of another embodiment of a battery cell comprising a flexible resistive thermal device.

With reference to FIG. 2, another embodiment 200 of a battery cell 205 comprising a flexible RTD 210 is shown. The battery cell 205 includes a surface 215, a negative electrode 220, and a positive electrode 225. The flexible RTD 210 comprises a conductive circuit 230 on a substrate 235 that is disposed on the surface 215 of the battery cell 205. The substrate 235 comprises a substantially nonconductive material. A portion 240 of the substrate 235, depicted as a tab, extends beyond an edge 245 of the surface 215 of the battery cell 205. The portion 240 includes a plurality of terminals 250 electrically connected to the conductive circuit 230. The terminals 250 can be placed on one or both sides of the portion 240 of the substrate 235. The flexible RTD 210 covers about one quarter of the surface 215 of the battery cell 205 and is also positioned proximate the positive electrode 225.

With reference to FIG. 3, yet another embodiment 300 of a battery cell 305 comprising a flexible RTD 310 is shown. The battery cell 305 includes a substantially nonconductive surface 315, a negative electrode 320, and a positive electrode 325. The flexible RTD 310 comprises a conductive circuit 330 disposed directly on the substantially nonconductive surface 315 of the battery cell 305. A portion 360 of the battery cell 305, depicted as a tab, extends beyond an edge 345 of the surface 315 of the battery cell 305 and outwardly from the remainder of the battery cell 305. The portion 360 includes a plurality of terminals 350 electrically connected to the conductive circuit 330. The conductive circuit 330 and the terminals 350 are formed by printing directly onto the substantially nonconductive surface 315 and the portion 360 of the battery cell 305.

With reference to FIG. 4, yet another embodiment 400 of a battery cell 405 comprising a flexible RTD 410 is shown. The battery cell 405 includes a substantially nonconductive surface 415, a negative electrode 420, and a positive electrode 425. The flexible RTD 410 comprises a conductive circuit 430 disposed directly on the substantially nonconductive surface 415 of the battery cell 405. A plurality of terminals 450 electrically connected to the conductive circuit 430 and extend beyond an edge 445 of the surface 415 of the battery cell 405.

With reference to FIG. 5, yet another embodiment 500 of a battery cell 505 comprising a flexible RTD 510 is shown. The battery cell 505 includes a substantially nonconductive surface 515, a negative electrode 520, and a positive electrode 525. The flexible RTD 510 comprises a conductive circuit 530 and a substrate 535. The conductive circuit 530 is disposed directly on the substantially nonconductive surface 515 of the battery cell 405. The substrate 535 is attached to the surface 515 of the battery cell 505 and extends beyond an edge 545 of the battery cell 505. The substrate 535 includes terminals 550 electrically connected to the conductive circuit 530.

Figure 6:
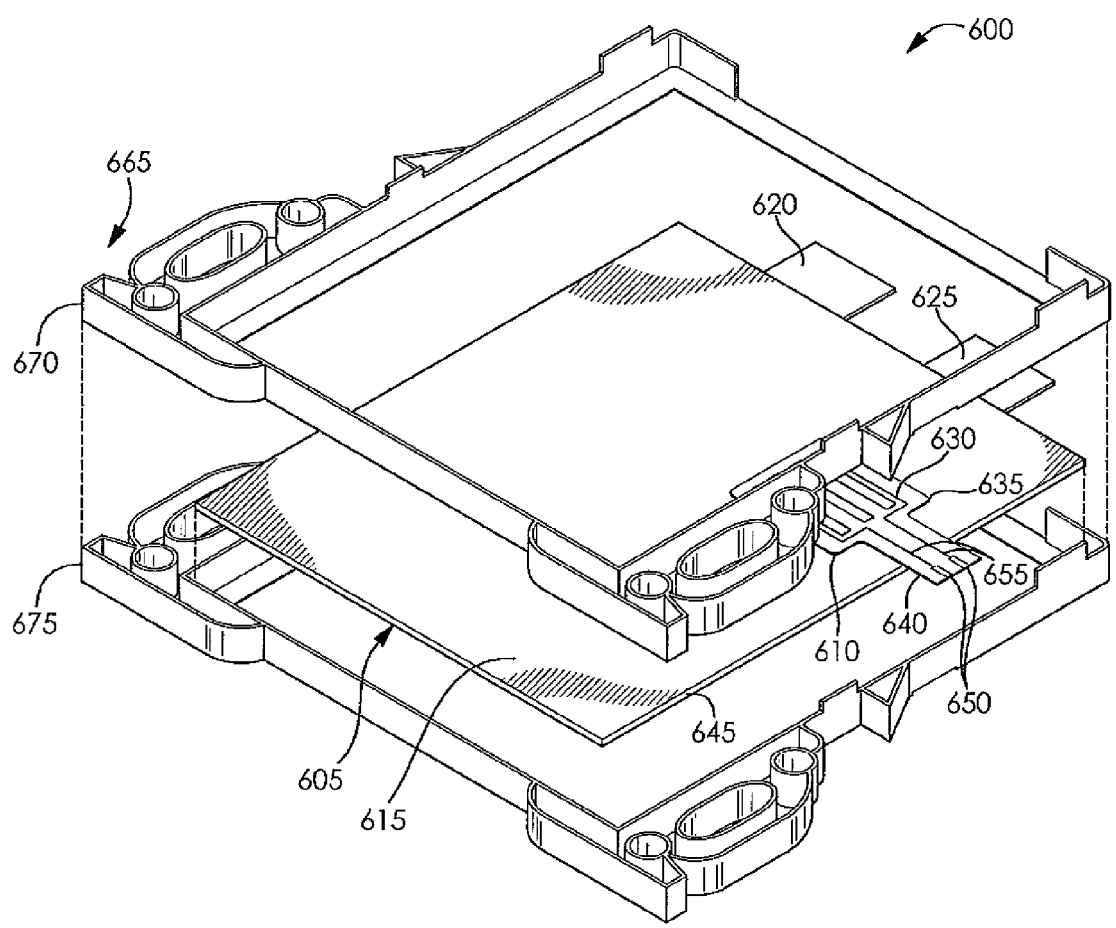
FIG. 6 is a perspective view of an embodiment of a battery cell comprising a flexible resistive thermal device disposed within a frame.

With reference to FIG. 6, an embodiment 600 of a battery cell 605 comprising a flexible RTD 610 that is disposed within a frame 665 is shown. The battery cell 605 includes a substantially planar surface 615, a negative electrode 620, and a positive electrode 625. The flexible RTD 610 comprises a conductive circuit 630 on a flexible and substantially planar substrate 635 that is disposed on the surface 615 of the battery cell 605. The substrate 635 comprises an insulating material; that is, the substrate 635 is substantially nonconductive. A portion 640 of the substrate 635, depicted as a tab, extends beyond an edge 645 of the surface 615 of the battery cell 605. The portion 640 includes a plurality of terminals 650 electrically connected to the conductive circuit 630 via leads 655. The terminals 650 can be placed on one or both sides of the portion 640 of the substrate 635. The portion 640 of the substrate 635 can also extend through or beyond a frame 665 placed around the battery cell 605 to facilitate coupling of a measuring circuit from an interconnect board (not shown) to the terminals 650. The flexible RTD 610 is disposed on the battery cell 605 using a high thermal conductivity adhesive. The frame 665 includes a first portion 670 and a second portion 675 that are assembled to permit the portion 640 of the substrate 635 to extend therethrough and beyond the frame 665 so the terminals 650 can be accessed by wires or connections to the interconnect board of the battery management system (not shown).

Figure 7:
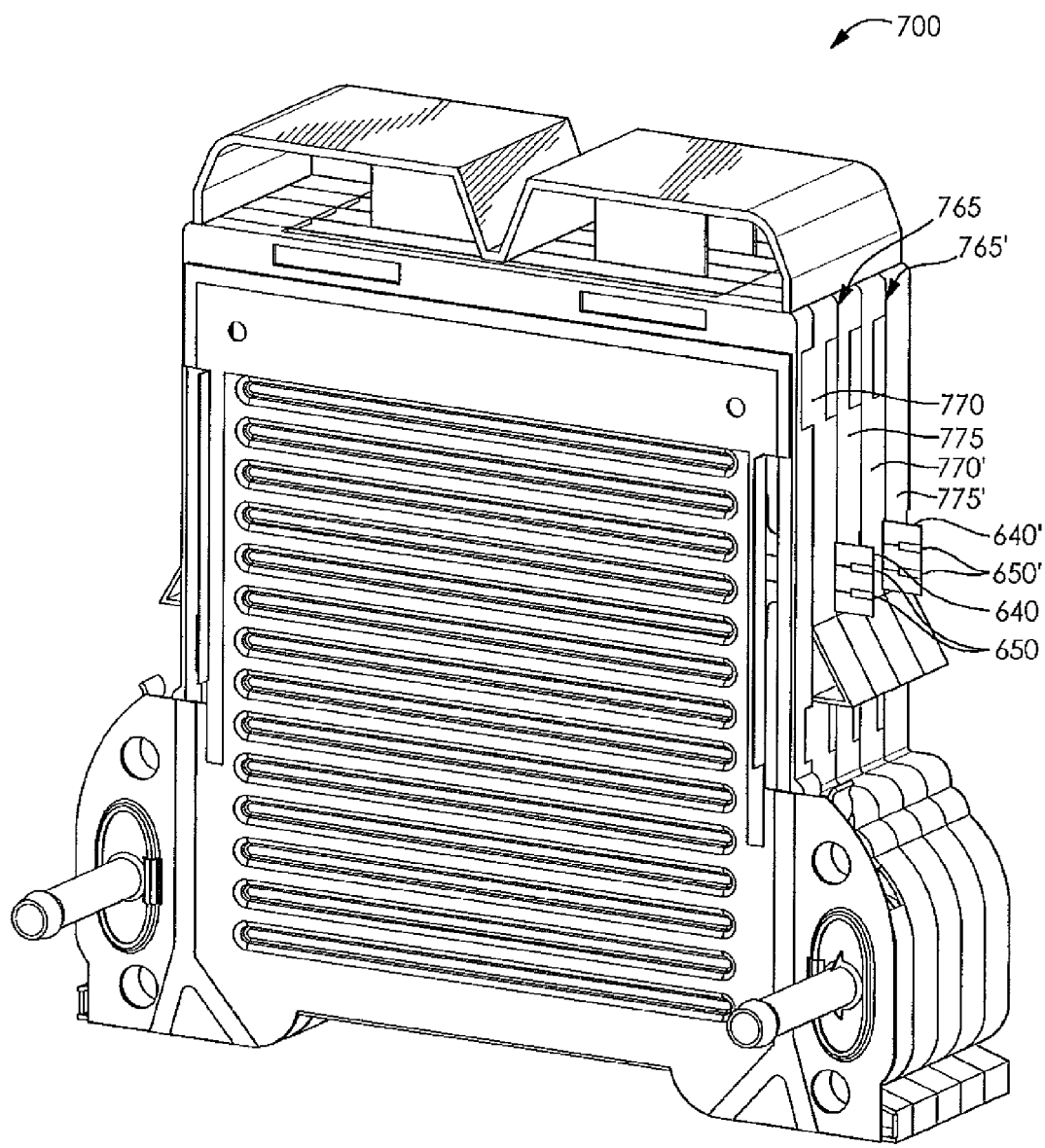
FIG. 7 is a perspective view of an embodiment of a battery assembly comprising two battery cells comprising flexible resistive thermal devices disposed within frames as shown in FIG. 6.

With reference to FIG. 7, an embodiment of a portion of a battery assembly 700 including two battery cells comprising flexible RTDs is shown. A first frame 765 comprising a first portion 770 and a second portion 775 are shown holding a first battery cell with a flexible RTD according to FIG. 6. Visible is the portion 640 of the substrate, depicted as a tab, that extends beyond an edge of the surface 615 of the first battery cell and between the first portion 770 and the second portion 775 of the first frame 765. A second frame 765' comprising a first portion 770' and a second portion 775' are shown holding a second battery cell with a flexible RTD according to FIG. 6. Visible is the portion 640' of the substrate, depicted as a tab, that extends beyond an edge of the surface of the second battery cell and between the first portion 770' and the second portion 775' of the second frame 765'. The terminals 650, 650' can be connected by wires or other electrical connections to a measuring circuit of an interconnect board of a battery management system (not shown).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A battery cell comprising:
   a prismatic battery cell including a pouch having a substantially planar exterior surface;
   a flexible resistive thermal device (RTD) for determining a temperature of the prismatic battery cell, the RTD disposed on the substantially planar exterior surface of the prismatic battery cell and comprising a conductive circuit and a plurality of terminals electrically connected to the conductive circuit, wherein the plurality of terminals of the RTD extend from a periphery of the substantially planar exterior surface of the prismatic battery cell; and
   a frame disposed about and adjacent the periphery of the substantially planar exterior surface of the prismatic battery cell, the frame independent of the substantially planar exterior surface of the prismatic battery cell, the frame particular to the prismatic battery cell, and the frame including a first portion and a second portion that are assembled to permit the plurality of terminals of the RTD to extend therethrough and beyond a periphery of the frame.

2. The battery cell of claim 1, wherein the prismatic battery cell comprises a lithium-ion battery cell.

3. The battery cell of claim 1, wherein the RTD contacts at least about 25% of the surface of the prismatic battery cell.

4. The battery cell of claim 1, wherein the prismatic battery cell includes a positive electrode that extends from the pouch and the RTD contacts the substantially planar exterior surface of the prismatic battery cell proximate to where the positive electrode extends from the pouch.

5. The battery cell of claim 1, wherein the substantially planar exterior surface of the prismatic battery cell is substantially nonconductive.

6. The battery cell of claim 5, wherein the conductive circuit is disposed directly on the nonconductive substantially planar exterior surface of the prismatic battery cell.

7. The battery cell of claim 1, wherein the conductive circuit comprises a serpentine pattern.

8. The battery cell of claim 1, wherein the conductive circuit comprises a thin-film of conductive material.

9. The battery cell of claim 8, wherein the thin-film of conductive material has a thickness of about 1 nm to about 10 nm.

10. The battery cell of claim 1, wherein the conductive circuit comprises aluminum.

11. The battery cell of claim 1, wherein the RTD comprises a substantially nonconductive substrate positioned between the conductive circuit and the substantially planar exterior surface of the prismatic battery cell.

12. The battery cell of claim 11, wherein the substantially nonconductive substrate comprises a polymer.

13. The battery cell of claim 1, further comprising a plurality of leads, each lead connecting a terminal of the plurality of terminals to the conductive circuit.

14. The battery cell of claim 1, wherein the RTD comprises a substantially nonconductive substrate positioned between the conductive circuit and the substantially planar exterior surface of the prismatic battery cell and a portion of the substantially nonconductive substrate extends from the periphery of the substantially planar exterior surface of the prismatic battery cell and comprises the plurality of terminals.

15. The battery cell of claim 1, wherein the substantially planar exterior surface of the prismatic battery cell is substantially nonconductive, the conductive circuit is disposed directly on the substantially planar exterior surface of the prismatic battery cell, and the plurality of terminals is disposed on a portion of a substantially nonconductive substrate that extends from the periphery of the substantially planar exterior surface of the prismatic battery cell.

16. The battery cell of claim 1, wherein the substantially planar exterior surface of the prismatic battery cell is substantially nonconductive and the conductive circuit is disposed directly on the substantially planar exterior surface of the prismatic battery cell.

17. The battery cell of claim 1, wherein the battery cell further comprises a battery management system electrically connected to the plurality of terminals and the RTD is configured to flex and bend to accommodate a change in one or more dimensions of the prismatic battery cell and remain electrically connected to the battery management system.

18. The battery cell of claim 1, wherein a majority of the substantially planar exterior surface of the pouch is not covered by the frame.

19. The battery cell of claim 1, wherein the RTD contacts at least about 25% of the surface of the prismatic battery cell, the prismatic battery cell includes a positive electrode that extends from the pouch, and the RTD contacts the substantially planar exterior surface of the prismatic battery cell proximate to where the positive electrode extends from the pouch.

20. A battery cell comprising:
a prismatic battery cell including a pouch having a substantially planar exterior surface;
a flexible resistive thermal device (RTD) for determining a temperature of the prismatic battery cell, the RTD disposed on the substantially planar exterior surface of the prismatic battery cell and comprising a conductive circuit and a plurality of terminals electrically connected to the conductive circuit, wherein the substantially planar exterior surface of the prismatic battery cell is substantially nonconductive, the conductive circuit is disposed directly on the substantially planar exterior surface of the prismatic battery cell, and the plurality of terminals is disposed on a tab of the prismatic battery cell substantially planar exterior surface extending from a remainder of the periphery of the substantially planar exterior surface of the prismatic battery cell; and
a frame disposed about and adjacent the periphery of the substantially planar exterior surface of the prismatic battery cell, the frame independent of the substantially planar exterior surface of the prismatic battery cell, the frame particular to the prismatic battery cell, and the plurality of terminals of the RTD extends outside a periphery of the frame.

21. A battery assembly comprising:
a plurality of prismatic battery cells, each prismatic battery cell including a pouch having a substantially planar exterior surface, wherein at least one prismatic battery cell comprises a flexible RTD for determining a temperature of the prismatic battery cell, the RTD disposed on the substantially planar exterior surface of the at least one prismatic battery cell and comprising a conductive circuit and a plurality of terminals electrically connected to the conductive circuit, wherein the plurality of terminals of the RTD extend from a periphery of the substantially planar exterior surface of the at least one prismatic battery cell;
a plurality of frames, each prismatic battery cell disposed within a separate frame, the frame disposed about and adjacent the periphery of the substantially planar exterior surface of the prismatic battery cell, and the frame including a first portion and a second portion that are assembled to permit the plurality of terminals of the RTD to extend therethrough and beyond a periphery of the frame; and
a battery management system electrically connected to the plurality of terminals.

* * * * *